No. 650,623. Patented May 29, 1900.
T. L. VALERIUS.
LIQUID DISPENSING APPARATUS.
(Application filed Oct. 9, 1899.)
(No Model.) 5 Sheets—Sheet 1.

Witnesses:
Fred Gerlach
Alberta Adamick

Inventor
Theodore L. Valerius
By Pierce & Fisher
Attorneys.

THE NORRIS PETERS CO., PHOTO-LITHO., WASHINGTON, D. C.

No. 650,623. Patented May 29, 1900.
T. L. VALERIUS.
LIQUID DISPENSING APPARATUS.
(Application filed Oct. 9, 1899.)
(No Model.) 5 Sheets—Sheet 2.

Witnesses:
Fred Gerlach
Alberta Adamick

Inventor:
Theodore L. Valerius
By Peirce & Fisher
Attorneys.

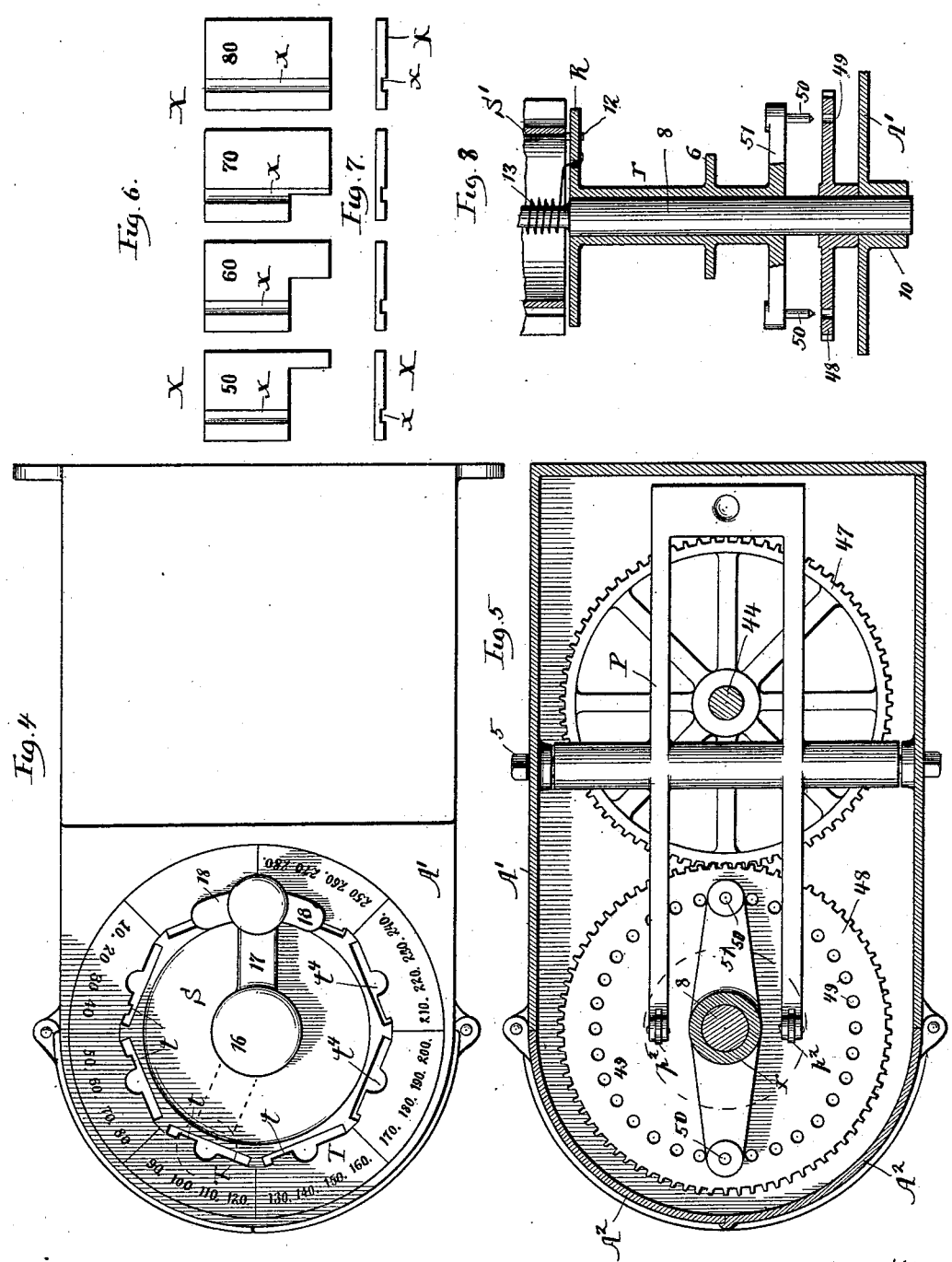

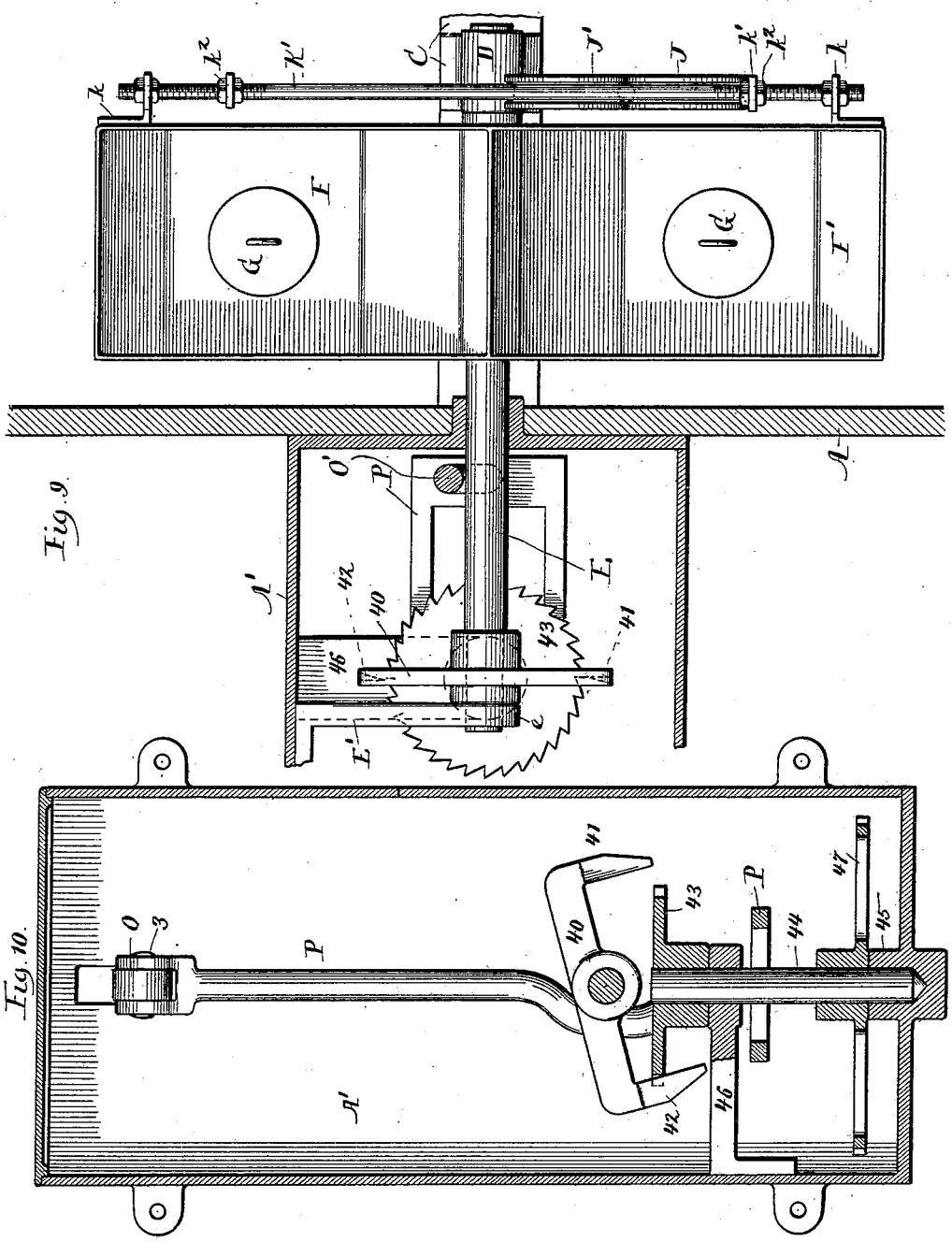

No. 650,623. Patented May 29, 1900.
T. L. VALERIUS.
LIQUID DISPENSING APPARATUS.
(Application filed Oct. 9, 1899.)
(No Model.) 5 Sheets—Sheet 5.
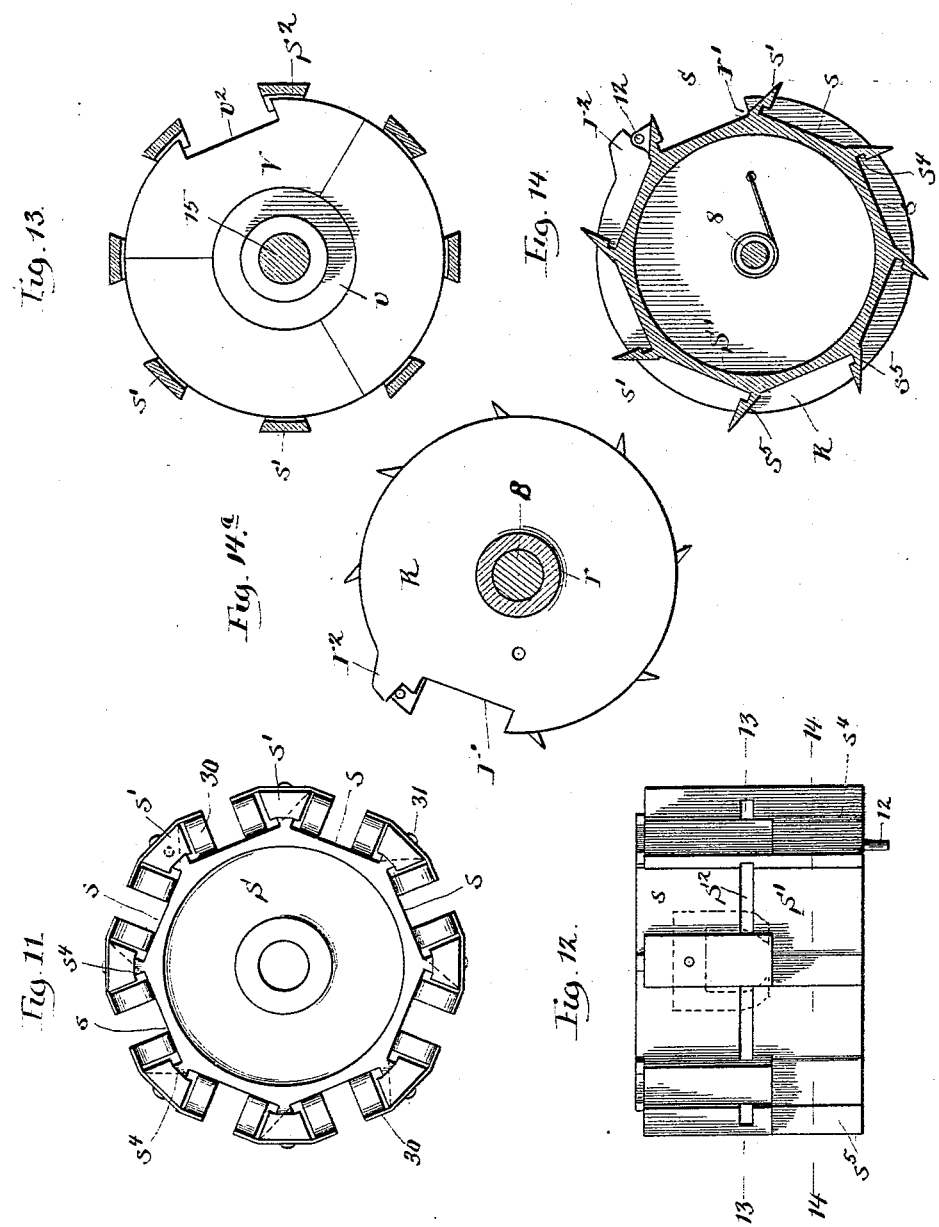

UNITED STATES PATENT OFFICE.

THEODORE L. VALERIUS, OF FORT ATKINSON, WISCONSIN, ASSIGNOR TO THE CREAMERY PACKAGE MANUFACTURING COMPANY, OF CHICAGO, ILLINOIS.

LIQUID-DISPENSING APPARATUS.

SPECIFICATION forming part of Letters Patent No. 650,623, dated May 29, 1900.

Application filed October 9, 1899. Serial No. 733,008. (No model.)

*To all whom it may concern:*

Be it known that I, THEODORE L. VALERIUS, a resident of Fort Atkinson, in the county of Jefferson, State of Wisconsin, have invented certain new and useful Improvements in Liquid-Dispensing Apparatus, of which the following is a full, clear, and exact description.

This invention has for its object to provide an improved construction of liquid-dispensing apparatus whereby predetermined amounts of liquid shall be automatically delivered in keeping with the particular character of checks or tokens that are introduced into the apparatus.

In the accompanying drawings the invention is shown as embodied in an apparatus particularly designed for dispensing predetermined quantities of milk; but manifestly the invention is susceptible of use for a variety of other purposes.

At many creameries throughout the country it is customary for the dairymen after delivering their supply of fresh milk to take away a quantity of skim-milk corresponding in amount to the fresh milk delivered after the butter-fats have been extracted therefrom. It is desirable when the fresh milk has been thus delivered to issue to the party delivering it a check or token that will enable him to withdraw from the dispensing apparatus the exact quantity of skim-milk that he is entitled to receive. My present invention affords a means whereby there will be automatically delivered to the party holding a skim-milk check a quantity of skim-milk in keeping with the which is determined by the character of the particular check or token that he has received.

The invention consists in the features of novelty hereinafter described, illustrated in the accompanying drawings, and particularly pointed out in the claims at the end of this specification.

Figure 1:
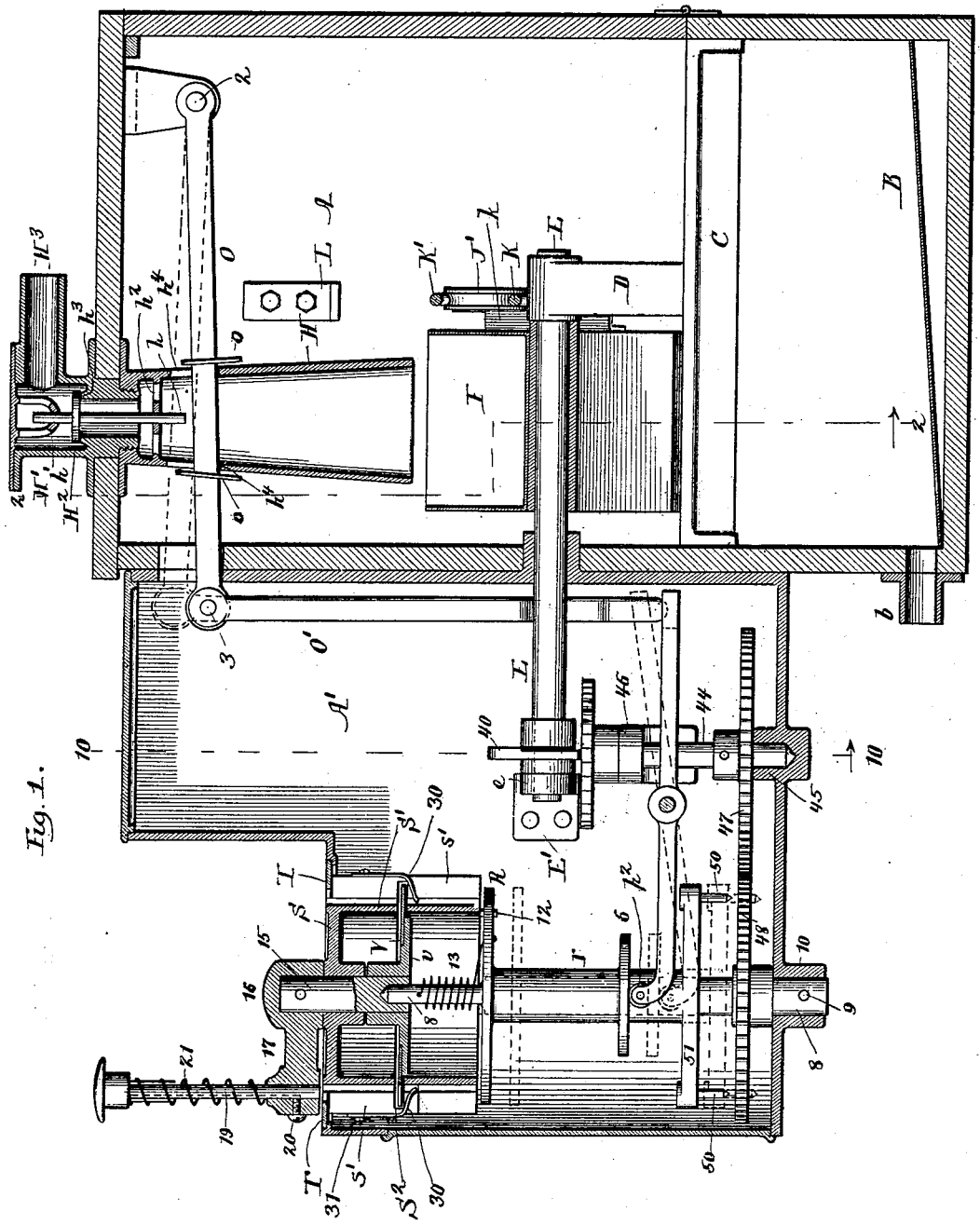
Figure 2:
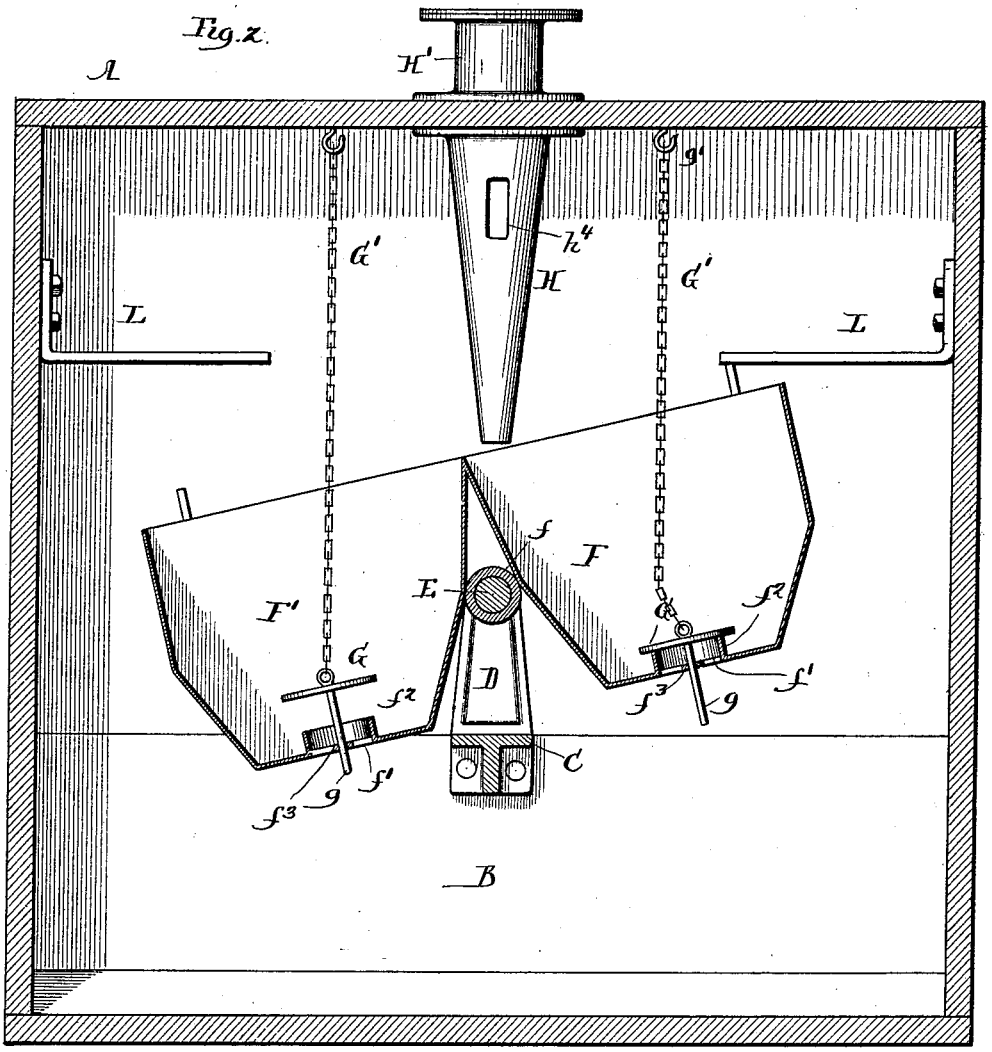
Figure 3:
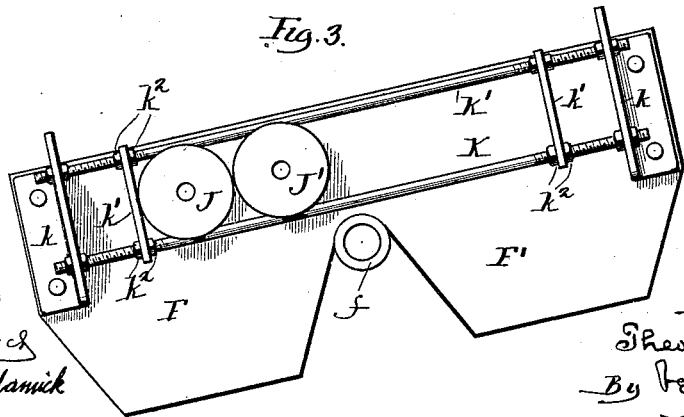

Figure 1 is a view in central vertical section through an apparatus embodying my invention. Fig. 2 is a view in vertical cross-section on line 2 2 of Fig. 1. Fig. 3 is a detail view, in side elevation, of the receiving-buckets. Fig. 4 is a plan view of the casing extension wherein most of the operating mechanism is contained. Fig. 5 is a view in horizontal section through the casing extension upon a line immediately above the operating-lever. Fig. 6 is a view in side elevation showing a group of numbered checks. Fig. 7 is a top edge view of the checks shown in Fig. 6. Fig. 8 is a central sectional view through the lower part of the check-receiver and parts beneath the same. Fig. 9 is a plan view of the receiving-buckets and parts connected therewith, the casing being shown in section. Fig. 10 is a view in vertical cross-section on line 10 10 of Fig. 1. Fig. 11 is a detail plan view of the check-receiver with the guard-plates removed from the top thereof. Fig. 12 is a detail view of the check-receiver in side elevation. Fig. 13 is a view in horizontal section on line 13 13 of Fig. 12, the guard-plate being shown in position. Fig. 14 is a view in horizontal section on line 14 14 of Fig. 12 with the releaser shown in position. Fig. 14$^a$ is an inverted plan view of the parts shown in Fig. 14.

In the lower part of the inclosing casing A is provided a delivery-tank B, from the bottom of which leads a discharge-spout, $b$ by which liquid will be delivered from the tank to cans or like receptacles, and across this tank A extends a supporting-bar C, from which rises a journal-bracket D, wherein is journaled one end of an operating-shaft E. The opposite end of this shaft E is sustained in a journal-bearing $e$, that is carried by a cross-bar or bracket E', (see Fig. 9,) that is conveniently fastened to the side wall of the casing extension A'. Upon the operating-shaft E are fixed the receiving-buckets F F', the lower portions of these buckets being preferably of inverted pyramidal shape. A journal-sleeve $f$ extends beneath the buckets at their point of support, and this sleeve is suitably fastened to the shaft E. In the bottom of each of the buckets F F' is formed a discharge-opening $f'$, having a raised seat $f^2$ to receive the valve G, the stem $g$ of this valve extending through and being guided by a perforated bar $f^3$, that extends across the corresponding discharge-opening $f'$. To each of the discharge-valves G is connected a chain or cord G', that is conveniently fastened, as at $g'$, to the top of the main casing, the length of the chain $G'$ being such that when either of the buckets F F' is in its lowermost position the valve will be lifted, but when the bucket is in its raised position the valve will be closed, as clearly shown in Fig. 2 of the drawings. The skim-milk or other liquid to be dispensed will be admitted to the receiving-buckets F F' by a delivery-spout H, (see Figs. 1 and 2,) that connects with the valve-chamber H', shown as mounted on top of the main casing. Within the valve-chamber H' is arranged a check-valve $H^2$, the stem $h$ of which is guided by suitable upper and lower perforated cross plates or bars $h'$ and $h^2$. The valve $H^2$ is preferably a puppet-valve and is adapted to close against a seat $h^3$ of the valve-casing H'. Milk or like liquid to be dispensed will be delivered to the valve-casing H' through a pipe $H^3$, that is connected with an overhead reservoir or other suitable source of supply. The receiving-buckets F F' are provided with one or more movable weights that insure the tipping of the buckets at the proper time, and adjusting mechanism is furnished in order to vary the amount of liquid that will be received by the buckets before they are tipped. Preferably I employ for this purpose one or more peripherally-grooved circular weights J J', that are sustained in manner free to travel along the rods K K', these rods K K' being carried by the angular brackets $k$, that are bolted to one of the outer walls of the receiving-buckets F F'. The rods K K' are screw-threaded and pass through the adjusting-plates $k'$, the position of these plates upon the rods being determined by means of set-nuts $k^2$.

From the foregoing description it will be seen that when the puppet-valve $H^2$, Fig. 1, is opened (as by mechanism to be presently described) liquid will pass through the valve-casing H' and discharge-spout H into one of the receiving-buckets—F, for example (see Figs. 1 and 2)—that is at such time beneath the spout H. The parts will remain in position shown in Fig. 2 until sufficient milk or like liquid has passed into the bucket F to overbalance the weights J J', thereby causing the bucket F to descend and causing the bucket F' to rise. As the bucket F thus descends the weights J J' will roll to a position opposite to that shown in Fig. 3, and as the bucket F reaches the end of its downward movement the valve G at the bottom of said bucket will be raised by the chain G', thereby permitting the milk or like liquid to discharge from the bucket F into the tank B, whence it will pass by discharge-spout $b$ into a milk-can or like receptacle. It will be understood that when the bucket F' ascends it will come in position beneath the delivery-spout H, and milk or like liquid will thus be alternately delivered into the buckets F F' so long as the admission-valve $H^2$ remains open. In order to limit the tilting movement of the buckets F F', I prefer to provide stop-arms L, that may be adjustably mounted upon the walls of the main casing A, and the stop-arms L L will be arranged above the corresponding buckets or brackets $k$, projecting therefrom, as clearly shown in Fig. 2 of the drawings.

The operation of the admission-valve $H^2$ will be controlled by suitable mechanism, the extent of movement of which will be determined by the character of the checks or tokens that will be introduced into the machine—that is to say, if the check or token introduced into the machine entitles the party presenting the same to receive seventy pounds of skim-milk, for example, the valve $H^2$ will remain open until that amount of skim-milk has been delivered through the spout H into the buckets F F' and has been discharged from said buckets into the tank B, after which the valve $H^2$ will be automatically closed. In the preferred form of the invention illustrated in the accompanying drawings the admission-valve $H^2$ is operated by an admission-valve lever O, that is pivoted, as at 2, to a bracket projecting from the casing A, this lever extending through slots $h^4$ in the side walls of the delivery-spout H (see Fig. 1) and beneath the stem $h$ of the admission-valve $H^2$. As shown, the lever O is provided with shields $o$ at each side of the delivery-spout H to insure the passage of the liquid into the buckets F F'. The admission-valve lever O is pivotally connected, as at 3, to a rod O', that extends downward and has its lower end seated in the rear end of the operating-lever P, (see Figs. 1, 5, and 10,) that is pivotally mounted, as on trunnion-screws 5, that project inward from the sides of the casing extension A'. The operating-lever P is preferably made as an open frame, its free arms being provided with friction-rolls $p^2$, that extend on either side of the hollow stem or post $r$ and bear against the flange 6 of said post. At its top the post $r$ carries a releaser or measuring-disk R, that is preferably formed in the shape of a disk that is provided with a notch $r'$, whereby at the end of a predetermined movement of the releaser R the check or token that has been introduced into the machine will be released and the delivery of skim-milk will be arrested, as will presently more fully appear. Through the tubular post $r$ of the releaser R passes the shaft 8, that is fixed by a pin or screw 9 in a socket 10 at the base of the casing extension A', the releaser R and its post being revolubly sustained upon this stationary shaft. Above the releaser R is the check-receiver S, that consists, preferably, of a top plate, from which depends an annular wall S'. The releaser R is held normally against or adjacent to the lower edge of the wall S' of the check-receiver, as shown by full lines in Fig. 1, and adjacent the notch $r'$ of the releaser R is a stop-arm $r^2$, adapted to contact with a stop-pin 12, that extends downward from the lower edge of the depending portion S' of the check-receiver. The circumference of the check-receiver S is formed with a series of vertical channels $s$ and intermediate ribs $s'$, (see Fig. 11,) and the tops of the several channels $s$ of the check-receiver are obstructed by suitable check-plates T, (see Fig. 4,) that are provided with projecting arms or lugs $t$, the shape or position of which will determine the character of the checks or tokens that may be admitted to the several channels. If a large number of channels $s$ are formed around the periphery of the check-receiver S, a single channel may be employed for each particular check that is to be used; but in order to reduce the size of the check-receiver I prefer to adapt each channel for receiving a plurality of checks, as will hereinafter more fully appear.

Adjacent each channel and preferably upon the check-plates T are marked numbers corresponding with the numbers that will be marked on the check or checks adapted to be admitted to the individual channels. Thus, for example, upon the check-plate of one channel will be marked the numbers "50," "60," "70," "80," thereby indicating that checks calling for fifty, sixty, seventy, or eighty pounds of skim-milk may be inserted in said channel. The releaser R is held normally in the position shown in Fig. 1 of the drawings—that is to say, adjacent the lower edge of the depending portion of the check-receiver—by suitable spring mechanism, (or the weight of connected parts may be relied upon for this purpose,) and suitable spring mechanism will also be provided for holding the stop-arm $r^2$ normally against the stop-pin 12 and for restoring the parts to such normal position after the predetermined quantity of skim-milk called for by any check has been delivered. Preferably a single coil-spring 13, that surrounds the upper end of the shaft 8, is employed both for holding the releaser R in normally-raised position (shown by full lines in Fig. 1 of the drawings) and also for holding the stop-arm $r^2$ of the releaser normally against the stop-pin 12 or for returning the parts to such normal position. The upper end of the coil-spring 13 is fixed to the shaft 8, while the lower end of this spring is fixed to the releaser R. About midway of the depending portion S' of the receiver is formed an annular groove $S^2$, that cuts through the hanging wall of the receiver and partially through the ribs $s'$, that extend between the vertical channels $s$, and within this annular groove $S^2$ extends a guard-plate V, that is preferably formed of segments suitably attached to a disk $v$, the hub of which is fixed to a shaft 15, having a seat to receive the upper end of the shaft 8. The shaft 15 passes up through the top plate of the check-receiver and at its upper end has fixed thereto the hub 16 of the crank-arm 17. The outer end of the crank-arm 17 is preferably formed with lateral extensions 18 and with a hole through which passes the plunger 19, that is held in position by means of a pin 20, the inner end of which enters a longitudinal groove formed in the plunger 19. The plunger 19 is encircled by a coil-spring 21, that bears against the head of the plunger and against the crank-arm 17 and serves to hold the plunger normally in the raised position shown in Fig. 1 of the drawings. The guard-plate V is formed with a slot or open space $v^2$, (see Figs. 1 and 13,) corresponding in width to one of the channels $s$ of the check-receiver, and this slot $v^2$ of the guard-plate is located beneath the plunger 19, so that whenever the plunger is brought opposite a channel in which a check has been placed said check may be forced downward by the plunger through the slot or open space $v^2$ of the guard-plate. It will be seen that each of the check-plates T is formed with a central notch $t^4$ to admit the plunger 19. By reference to Fig. 11 of the drawings it will be seen that both sides of the upper portions of the channels $s$ are formed with guide-grooves $s^4$, the purpose of which is to guide the checks as they are delivered to the channels. The lower parts of the channels have the guide-grooves at one side only, and at such side the adjacent rib $s'$ is cut away or beveled, as shown at $s^5$, (see Fig. 14,) in order that the checks at the proper time may be readily discharged, as will presently appear. Into each of the channels $s$ extends the free end of a catch-spring 30, the function of which is to hold the checks that may have been forced downward to the lower part of the channels $s$. As shown, the springs 30 are U-shaped plates (see Figs. 11 and 12) attached, as at 31, to the ribs $s'$ of the check-receiver in such manner that the springs extend into the channels $s$ and normally across the path of the checks inserted therein.

In Figs. 6 and 7 of the drawings is shown one set of checks X, that is adapted to enter one of the channels $s$ of the check-receiver. Each of these checks X is formed with a groove $x$, extending throughout its length and adapted to admit the lug $t$ of the check-plate of the particular channel which this set of checks is designed to enter. The lower edges of each of the checks of a set are of different length, and it is this extent of the lower edges that determines the length of time that the checks shall serve to hold the admission-valve $H^2$ open, and hence the quantity of milk that will be delivered, as will hereinafter more fully appear.

The operation of the parts thus far defined will be seen to be as follows: If a check—for example, the check marked "60" in Fig. 6 of the drawings—be inserted in the channel $s$ of the check-receiver, above which extends a correspondingly-marked check-plate, the check will descend until it rests upon the guard-plate V. If now the crank 17 be turned until the plunger 19 is above the inserted check, then by depressing the plunger the check will be forced down until it passes below the end of the check-catch 30, which will retain it in depressed position. As the check X is thus forced downward it will move the releaser R from the position shown by full lines to the position shown by dotted lines in Fig. 1 of the drawings. The depression of the releaser R causes the lever P, through the medium of the rod O', to lift the valve-lever O, thereby raising the admission-valve H² and allowing the skim-milk or like liquid to flow to the receiving-buckets F F' beneath it. As the bucket F, for example, is filled with liquid it overbalances the bucket F' and the weights J J' and descends, thereby causing said bucket F' to rise to a position beneath the spout H, while the weights pass to the opposite ends of the rods. The buckets F F' are thus alternately filled and rise and fall, each bucket as it descends being discharged of its contents by the lifting of the discharge-valve at its bottom, and this operation continues so long as the valve H² remains open.

By reference to Fig. 4 of the drawings it will be seen that the point of the releaser R, on which will bear the lower edge of the check inserted, is at a distance from the open space or notch $r'$ of the releaser. If now the releaser be revolved until the notch $r'$ shall move from its normal position to a point beneath the lower end of the check X, then the lower part of said check will drop into said notch, and the releaser being no longer held down by the check will be returned by the weight of the connected parts and by the spring 13 to the position shown by full lines in Fig. 1. At the same time also the releaser will be disengaged from the means (hereinafter described) by which its partial revolution from normal position has been effected and will be reversely turned by the spring 13 until the stop-arm $r^2$ is again in normal position against the stop-pin 12. As the releaser is thus returned to normal position the reduced lower end of the check X will be caught by the edge of the notch $r'$ and the check will be forced along the beveled wall $s^5$ of the adjacent channel-rib, (see Fig. 14,) and will thus be thrown out of the receiver. The check X thus discharged will fall into a convenient tray or receptacle that may be located at any point beneath the releaser R. If instead of a check bearing the number "60" another check of the same set—that bearing the number "70," for example—should be inserted in the same channel $s$ of the check-receiver, it is manifest that as the bottom edge of said check bearing the number "70" is longer than the bottom of check bearing the number "60" a greater extent of movement of the releaser R will be required to bring the notch $r'$ far enough beneath the check to permit it to drop and to permit the releaser to rise. Hence the admission-valve H² will remain open longer than it did when the check numbered "60," having a shorter lower edge, was inserted, and consequently a greater quantity of skim-milk will be delivered. It will be understood, therefore, that checks adapted to be inserted in channels remote from the normal or starting point of the notch $r'$ of the releaser will insure a delivery of greater quantities of milk than will result from the insertion of checks in channels nearer said point, and it will be seen also that of several checks adapted for insertion in the same channel those having the longest lower edges will effect the delivery of the largest quantity of milk or like liquid. The oscillation of the buckets F F', as before described, serves to insure the accurate movement of the releaser R from its normal position of rest until its notch $r'$ is beneath a check that has been inserted into the check-receiver, and in the preferred form of the invention the oscillation of the buckets F F' serves to positively move the releaser from its normal position toward the check that has been inserted. To effect this positive movement of the releaser R, I prefer to employ the mechanism next to be described, although manifestly many other forms of mechanism might be adapted for this purpose without departing from the broad spirit of my invention.

Upon the shaft E is fixed a duplex pawl 40, the depending arms 41 and 42 of which are adapted to alternately engage the teeth of a ratchet-wheel 43, that is fixed to a shaft 44, this shaft 44 being stepped in a suitable bearing 45 and being also supported by a bracket 46, extending from the side wall of the casing extension A'. (See Figs. 1, 9, and 10.) The inner edges of the pawl-arms 41 and 42 are reversely beveled, as shown, and the beveled edges of these arms engage the inclined backs of the teeth of the ratchet-wheel 43. Hence it will be seen that when the oscillation of the buckets F F' imparts a like movement to the main shaft E the pawl-arms 41 and 42 will alternately engage the teeth of the ratchet-wheel 43 and will at each engagement effect a partial revolution of the ratchet-wheel and its shaft 44. To the shaft 44 is keyed a gear-wheel 47, that meshes with a gear-wheel 48, (see Figs. 1 and 5,) that is loosely mounted at the lower end of the stationary shaft 8. In the gear-wheel 48 is formed a series of holes 49, adapted to receive clutch-pins 50, that depend from the clutch-arms 51, carried by the lower end of and preferably formed integral with the tubular sleeve or post $r$. In the construction shown the gear-wheel 48 is furnished with thirty-two holes, corresponding in number with the teeth of the ratchet-wheel 43. By reference to Fig. 1 it will be seen that when the releaser R is in its normally-raised position the pins 50 do not engage the gear-wheel 48, but when the releaser R is depressed by the insertion of a check X into the check-receiver, as hereinbefore described, the pins 50 will be brought into clutch engagement with the wheel 48. Hence it will be seen that when the releaser is depressed by the insertion of a check not only will the admission-valve H² be open, but the admission of liquid to the buckets F F' will effect the oscillation of these buckets, and the movements of the buckets F F' will be imparted by the shaft E and duplex pawl 40 to the ratchet-wheel 43, which in turn through the shaft 44 will impart revolution to the gear-wheels 47 and 48 and through the clutch-pins 50 and arms 51 to the releaser R. The releaser R will thus be revolved, carrying its releasing-notch or open space r' from normal position until such notch passes beneath the check that has been inserted into the receiver, thereby permitting the releaser R to rise and disengage the clutch-pins 50 from the gear-wheel 48 at the same time that the admission-valve H² is closed.

It will be understood that the particular channel of the check-receiver S beneath which the notch r' at the measuring-disk stands when in normal position will be blank, since manifestly this notch cannot be used. The weights J J' not only serve to enable the movement of the buckets F F' to more effectively actuate the releaser, but by adjusting the travel of these weights as hereinbefore described the exact amount of liquid that will be received by each bucket before it passes from beneath the delivery-spout can be accurately regulated. Preferably the front of the casing extension A' will be formed of hinged doors A² (see Figs. 4 and 5) to afford convenient access to the interior of the casing extension.

It will be readily understood that the precise details of construction above set out may be varied within wide limits without departing from the spirit of the invention and that features of the invention may be employed without its adoption as an entirety. To such details, therefore, I do not wish the invention to be understood as restricted.

So far as I am aware this invention presents the first instance of a check-controlled apparatus in which there are a series of channels adapted to receive checks and a releasing device adapted to be moved adjacent the check-receiving channels, the extent of movement of said releasing device being determined by the position of a check in any channel, so as to correspondingly determine the extent of operation of the machine. In prior machines the extent of operation of the machine is made dependent upon the peculiar operative value of the check, the checks of different values being placed in the same receiving-channel, and is not dependent upon the particular channel of the machine in which such check is inserted. Manifestly the checks or tokens instead of being formed with grooves in their faces to determine the particular channels of the receiver into which they may enter might be formed with ribs, which would be an obvious equivalent, and in such case the check-plates at the mouth of the receiver-channels would be formed with corresponding grooves instead of the lugs or extensions shown in the drawings.

Having thus described my invention, what I claim as new, and desire to secure by Letters Patent, is—

1. In a liquid-dispensing apparatus, the combination with a valve for determining the flow of liquid, of mechanism for controlling said valve comprising a check-receiver provided with a plurality of channels to receive checks, means adjacent said channels for operating the admission-valve when a check is inserted in either of said channels, a releasing device arranged to travel adjacent said channels to release the checks and means for actuating said releasing device.

2. In a liquid-dispensing apparatus, the combination with a valve for determining the flow of liquid, of mechanism for controlling said valve comprising a check-receiver provided with a plurality of channels to receive checks, means adjacent said channels for operating said admission-valve when a check is placed in either of said channels, a releasing device adapted to travel adjacent said channels and to release said checks, means for moving said releasing device to position where it will release the check, and means for moving said releasing device back to normal position.

3. In liquid-dispensing apparatus, the combination with a delivery-spout and with an admission-valve, of movably-supported means for receiving the liquid from said spout, a check-receiver having a plurality of channels, means for effecting the opening of the admission-valve upon the insertion of a check in the receiver, a movable releaser or measuring device arranged to normally obstruct the channels of the check-receiver and mechanism intermediate the liquid-receiving means and said releaser or measuring device for moving said releaser from normal position to a point opposite the channel of the receiver in which a check has been inserted, and means for restoring said releaser or measuring device to normal position.

4. In liquid-dispensing apparatus, the combination with a delivery-spout and with an admission-valve for controlling the flow of liquid through said spout, of a check-receiver provided with a plurality of channels for the admission of different checks, a movable releaser or measuring device normally obstructing said channels and mounted in manner free to move away from said receiver and to revolve beneath said channels, said releaser or measuring device being provided with an open space adapted to be brought beneath the channels, connections between said releaser and the admission-valve whereby when the releaser is moved away from the check-receiver by the insertion of a check the admission-valve will be open and suitable mechanism intermediate the releaser and the liquid-receiving means whereby said releaser may be turned until its open space comes opposite the check that has been introduced into the receiver to effect the release of the check and means for restoring the receiver to normal position.

5. In liquid-dispensing apparatus, the combination with a delivery-spout and with an admission-valve, of a check-receiver provided with a plurality of channels adapted to admit different checks, a revoluble check-releaser or measuring-disk located opposite the channels of the check-receiver and movable toward and from said channels and provided with an open space or notch adapted to be moved beneath the channels of the check-receiver, lever mechanism intermediate the check-releaser or measuring-disk and the admission-valve whereby when a check is inserted into the receiver the admission-valve will be opened, movably-supported means for receiving the liquid from the delivery-spout and mechanism intermediate said liquid-receiving means and the releaser or measuring-disk for insuring the accurate revolution of said releaser or disk to a point beneath the check that has been inserted into the receiver and means for restoring the releaser or measuring-disk to normal position and for closing the admission-valve.

6. In liquid-dispensing apparatus, the combination with a delivery-spout and with an admission-valve for controlling the flow of liquid through said spout, of a check-receiver having a plurality of channels adapted to admit checks of different relative values, a movable guard-plate for normally obstructing the channels of the check-receiver but provided with an opening through which a check may pass, means for shifting said guard-plate opposite the channel into which a check is inserted, a movable releaser or measuring device extending opposite the channels of the check-receiver and provided with a notch or open space to release the check, a spring for holding said releaser in normal position and mechanism actuated by the liquid-receiving means for moving said releaser from its normal position to a point opposite the check that has been inserted into the receiver.

7. In liquid-dispensing apparatus, the combination with a delivery-spout and an admission-valve, of a check-receiver, a movable check-releaser or measuring device and means connected therewith for opening the admission-valve, movable receiving-buckets beneath said delivery-spout and mechanism intermediate said buckets and said check-releaser or measuring device whereby the movement of said buckets shall determine the extent of movement of the releaser in order to effect the closing of the admission-valve.

8. In liquid-dispensing apparatus, the combination with a delivery-spout and with an admission-valve, of a pair of oscillating buckets beneath said delivery-spout, a check-receiver provided with channels to receive different checks, means for opening the admission-valve adapted to be actuated when a check has been inserted in the check-receiver and mechanism suitably connected with said oscillating buckets for effecting the closing of said admission-valve.

9. In liquid-dispensing apparatus, the combination with a delivery-spout and with an admission-valve, of a pair of oscillating buckets beneath said delivery-spout, a check-receiver provided with channels to receive different checks, a releaser or measuring device located opposite said channels and movable therefrom by the insertion of a check, said releaser being provided at one point with means for releasing the check, mechanism intermediate said releaser or measuring device and the admission-valve for opening said valve and mechanism intermediate the releaser or measuring device and said buckets, whereby said releaser is moved by the oscillation of said buckets from normal position to a point where it will effect the release of the check and means for restoring said releaser to normal position when the admission-valve is closed.

10. In a liquid-dispensing apparatus the combination with a valve for determining the flow of liquid, of mechanism for controlling said valve comprising a check-receiver provided with a plurality of stationary channels to receive checks, suitable means for operating said admission-valve, said means comprising a part extending opposite said channels and in position to be actuated by the checks inserted therein, a releasing device arranged to travel opposite said check-receiving channels and adapted to release any check held therein, means for moving said releasing device in one direction and pawl-and-ratchet mechanism for actuating said releasing device to move it in the opposite direction.

11. In a liquid-dispensing apparatus the combination with a valve for determining the flow of liquid, of mechanism for controlling said valve comprising a check-receiver provided with a plurality of stationary channels to receive checks, suitable guards for determining the character of checks that can be admitted to any of said channels, means for operating the admission-valve when a check is placed in either of said channels, a releasing device movable adjacent said channel to release the checks and means for actuating said releasing device.

12. In liquid-dispensing apparatus, the combination with a delivery-spout and with an admission-valve, of a pair of oscillating buckets beneath said delivery-spout, a check-receiver provided with channels to receive different checks, a releaser or measuring device arranged to normally obstruct said channels or receiver but movable away therefrom by the insertion of a check and rotatable beneath said channels, said releaser or measuring device being provided with a notch or open space to release the check, suitable connections between said admission-valve and said check-releaser or measuring device whereby upon the insertion of a check and the shift of the releaser or measuring device the admission-valve will be opened, a shaft connected with said oscillating buckets, gearing and clutch mechanism for revolving said releaser and pawl-and-ratchet mechanism intermediate said gearing and said operating-shaft for determining the movement of said gearing.

13. In liquid-dispensing apparatus, the combination with a delivery-spout and with an admission-valve for controlling the flow of liquid through said spout, of a check-receiver adapted to admit different checks, means for opening the admission-valve adapted to be actuated when a check has been inserted in the check-receiver, oscillating buckets for receiving the liquid from the delivery-spout, an operating-shaft connected with said oscillating buckets, suitable gearing in one member of a clutch adapted to be actuated by said shaft, a releaser or measuring device provided with a clutch member and provided with a disk or part normally extending in the path of the checks inserted in the receiver whereby when a check is inserted in the receiver the clutch members will be brought into engagement and the admission-valve will be opened, and whereby also the oscillating movement of the buckets will move the releaser from its normal position to a position at which the closing of the admission-valve will occur and the clutch members will be disengaged.

14. In liquid-dispensing apparatus, the combination with a delivery-spout and with an admission-valve for controlling the flow of liquid through said spout, of a check-receiver having a plurality of channels adapted to admit checks of different relative values, a movable guard-plate for normally obstructing the channels of the check-receiver but provided with an opening through which a check may pass, a crank-arm connected with said guard-plate and provided with a plunger whereby when said plunger is shifted above a check said check may be forced through the guard-plate, a movable releaser or measuring device extending opposite the channels of the check-receiver and provided with a notch or open space to release the check and mechanism actuated by the liquid-receiving means for moving said releaser from its normal position to a point opposite the check that has been inserted in the receiver.

15. In liquid-dispensing apparatus, the combination with a delivery-spout and with an admission-valve, of a check-receiver provided with a plurality of channels adapted to admit different checks, a series of springs extending across said channels and adapted to prevent the backward movement of the checks after they have been forced through the channels past the springs, a revoluble check-releaser or measuring device located opposite the channels of the check-receiver and movable toward and from said channels and provided with an open space or notch, suitable means intermediate the check-releaser and the admission-valve for opening said valve, movably-supported means for receiving the liquid from the delivery-spout and mechanism intermediate said liquid-receiving means and the releaser or measuring device for insuring the revolution of said releaser or measuring device until its open space is brought beneath the check that has been inserted into the receiver and means for restoring the releaser or measuring device to normal position.

16. In liquid-dispensing apparatus, the combination with a delivery-spout and with an admission-valve, of a check-receiver provided with a series of vertical channels, a movable plunger for forcing checks down said channels, a guard-plate movable with said plunger and normally obstructing said channels, suitable catches in said channels to resist the upward movement of the checks, a revoluble releaser or measuring-disk having a notch or open space and extending beneath said channels, a support whereby said releaser or disk is sustained in manner permitting it to move toward or from said receiver, lever mechanism intermediate said releaser and said admission-valve whereby said valve is opened when the releaser is depressed, oscillating buckets located beneath the delivery-spout and suitable connections and gearing mechanism intermediate said buckets and said releaser comprising a clutch, one member whereof is normally out of engagement with the gearing but is adapted to be engaged therewith when the releaser or measuring-disk is depressed.

17. In liquid-dispensing apparatus, the combination with a delivery-spout and an admission-valve, of oscillating buckets mounted beneath said spout, a shaft connected to said buckets and provided with an oscillating pawl, a ratchet-wheel engaged by said pawl, gear-wheels connected to said ratchet-wheel, a check-receiver provided with channels to admit different checks, a revoluble releaser extending beneath the channels of said check-receiver and provided with a notch or open space, a spring for returning said releaser to normal position, a clutch member connected with said releaser and adapted to be driven by the gear-wheels when the releaser is moved away from the check-receiver and an operating-lever suitably connected with the releaser and means connected therewith for shifting the admission-valve, the arrangement of the parts being such that when the releaser is moved away from the check-receiver the admission-valve will be opened and the releaser will be actuated by the gear-wheels that in turn will be driven by the oscillating buckets until the notch or open space of the releaser comes opposite the check that has been inserted in the receiver.

THEODORE L. VALERIUS.

Witnesses:
WARNER W. CORNISH,
SHELDON S. SWASEY.